United States Patent [19]

Yamada

[11] 4,222,077
[45] Sep. 9, 1980

[54] ANALOG-DIGITAL CONVERSION METHOD, AND A PICTURE REPRODUCTION METHOD USING THE SAME

[75] Inventor: Mitsuhiko Yamada, Kyoto, Japan

[73] Assignee: Dainippon Screen Seizo Kabushiki Kaisha, Kyoto, Japan

[21] Appl. No.: 41,525

[22] Filed: May 22, 1979

[30] Foreign Application Priority Data

Jun. 2, 1978 [JP] Japan ................................ 53-65665

[51] Int. Cl.² .......................... H04N 1/40; H04N 7/12
[52] U.S. Cl. ............................... 358/280; 340/347 SH; 358/138; 358/263
[58] Field of Search .......... 340/347 SH, 347 MS File; 358/138, 263, 280, 260, 284; 364/575; 328/151

[56] References Cited

U.S. PATENT DOCUMENTS

| | | | |
|---|---|---|---|
| 2,962,548 | 11/1960 | Taudt .................................. | 358/284 |
| 2,989,741 | 6/1961 | Gordon et al. ................. | 340/347 M |
| 3,879,724 | 4/1975 | McDonald .................... | 340/347 AD |

Primary Examiner—John C. Martin
Assistant Examiner—Joseph A. Orsino, Jr.
Attorney, Agent, or Firm—Zarley, McKee, Thomte, Voorhees & Sease

[57] ABSTRACT

A method of analog-digital conversion is disclosed, wherein sub-sampling of an analog signal is performed at a certain multiple n of the basic sampling rate, wherein a discrimination signal including extreme position signals is obtained by detecting the level difference between the analog signal and an unsharp signal, and wherein from n consecutively-produced values representative of the analog signal the digital signal to be output is obtained as being; if the extreme position signal is detected, then the consecutively-produced representative value corresponding thereto; otherwise, the average of the n consecutively-produced representative values.

8 Claims, 6 Drawing Figures

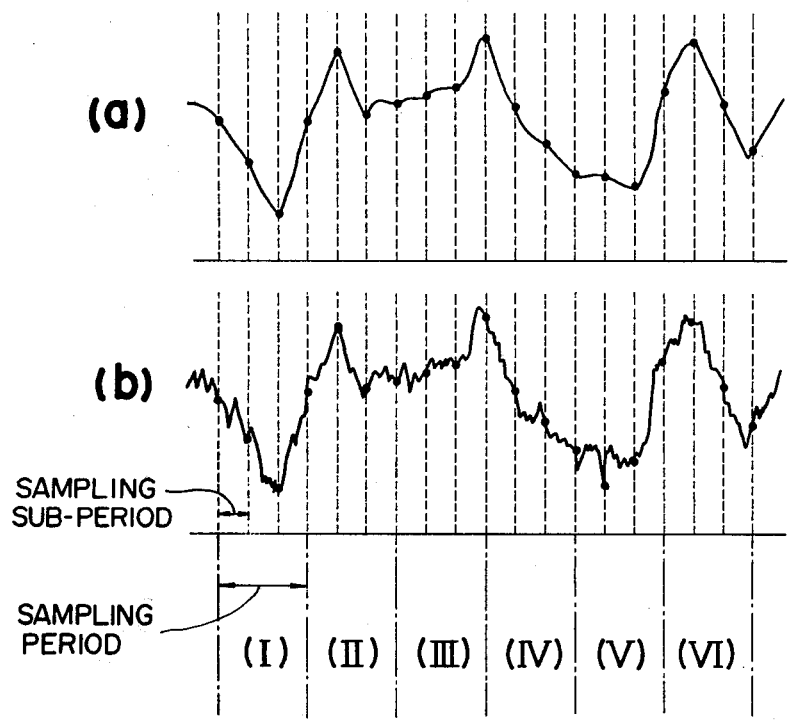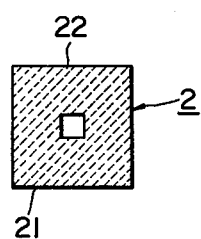

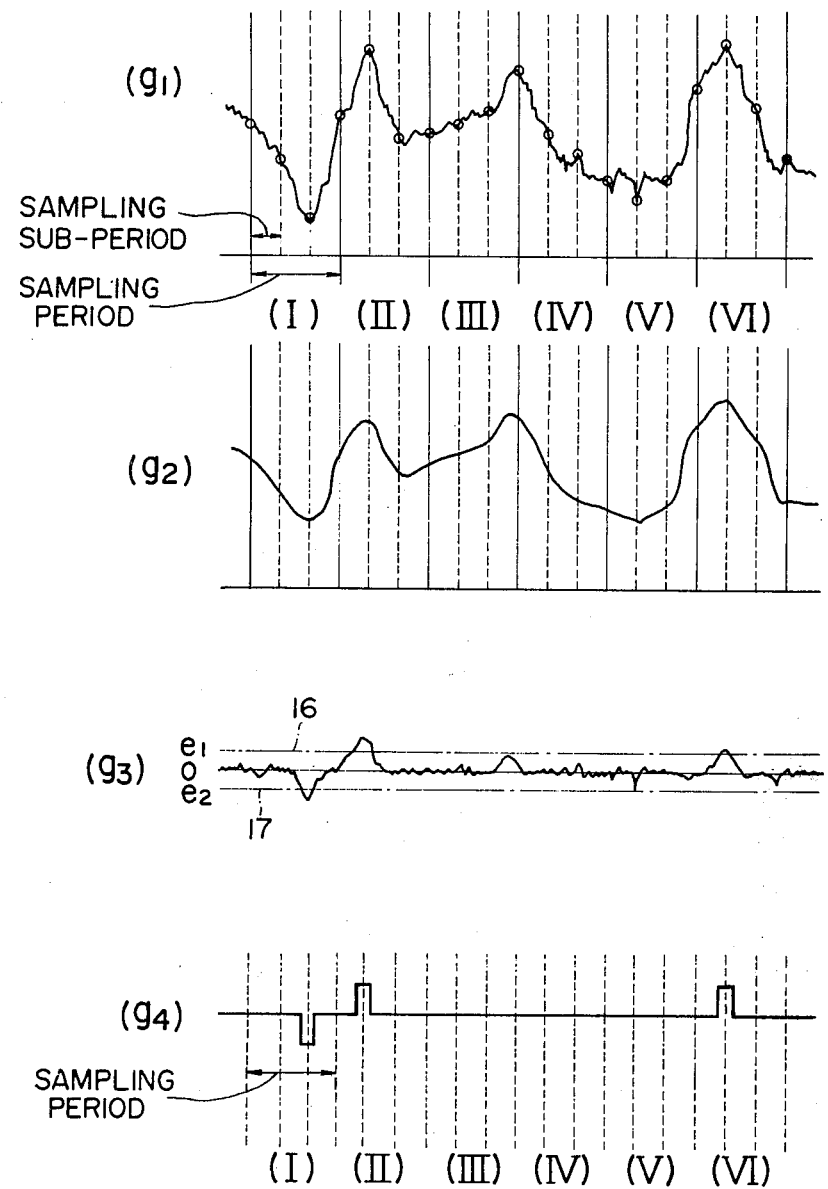

ANALOG-DIGITAL CONVERSION METHOD, AND A PICTURE REPRODUCTION METHOD USING THE SAME

BACKGROUND OF THE INVENTION

This invention relates to a method for analog-digital conversion, wherein an analog signal is sampled and a digital signal is output which corresponds to the analog signal. It further relates to a picture reproducing method which uses this method of analog-digital conversion.

In a machine for reproducing a picture, wherein an original picture is scanned and analog picture signals are produced, the analog picture signals are converted into digital picture signals by sampling according to a certain sampling frequency, these digital picture signals are stored into a memory, and then these digital picture signals are read out, converted into analog output picture signals, and then a reproduction picture is produced by using these analog reproduction picture signals. Thus the frequency range of the analog signal reproducible faithfully generally depends upon the sampling frequency, and, the higher is the sampling frequency, the finer detail can be reproduced. However, the higher is the sampling frequency, the greater is the capacity required for the memory, which involves a higher cost. Thus in practice limitations are imposed on the sampling frequency.

In order to avoid the abovementioned defects, another analog-digital conversion method for an analog signal has been proposed by the same inventor as the present invention. In this case, for example, an analog picture signal is converted into digital signals by sampling at a certain sampling rate corresponding to the analog picture signal by sampling sub-signals having a frequency of $3f_0$, which is three times as high as frequency as that of the sampling signal, which have a frequency of $f_0$. The level of the sampling signal is obtained, as being: if the second one of the three consecutive sampling sub-signals is an extreme, i.e. the maximum or the minimum of them, then it; otherwise, the average of the three consecutive sampling sub-signals.

In this case, the frequency of the signal for sampling the analog signal is raised to be three times as high, but the output number of the sampling signals which are sent to the memory is the same, as in a conventional method. Thus the conventional memory can be used, without increasing its capacity.

However, this method has a disadvantage: that is, when noise components are mixed into an analog signal shown in FIG. 1a, as shown in FIG. 1b by jagged lines, the noise components are prone to be picked up as the level of the sampling signal at an extreme point or a point very near thereto.

That is, when the picture signal of FIG. 1b is sampled by the aforementioned method, in the sampling periods I, III, and IV of the sampling signal having the frequency $f_0$ (sampling period $1/f_0$) the level of the sampling is the mean value of the three sampling sub-signals having the frequency $3f_0$ (sampling sub-period $\frac{1}{3}f_0$), and in the sampling periods II, V and VI of the sampling signal the level of the sampling signal is substantially the extreme of the three sampling sub-signals.

As shown in FIG. 1, for instance, in the sampling period V, since the relatively large noise component is included in the picture signal, although the sampling sub-signals simply increase or decrease and the average of these should be output, however, the noise component of the extreme is picked up as the output level of the sampling signal.

SUMMARY OF THE INVENTION

Therefore it is an object of the present invention to provide an analog-digital conversion method for an analog signal free from the aforementioned defects, which is reliable.

Further, it is an object of the present invention to provide a method of picture reproduction which performs analog-digital conversion using the abovementioned method.

According to the present invention, there is provided an analog-digital conversion method; wherein digital signals are produced at a certain sampling frequency rate corresponding to an first analog signal; and wherein values representative of the first analog signal are produced at a frequency rate which is some multiple n of the sampling frequency rate, characterized in that the level difference between the first analog signal and a second analog signal which is a smoothed version of the first analog signal, is detected to obtain a third analog signal including extreme values; that extreme positions in the third analog signal are discriminated in synchronization with n consecutively-produced representative values by setting negative and and positive threshold levels to obtain a fourth signal including extreme position signals; and that each digital signal produced is obtained from the n consecutively-produced representative values, as being: if the extreme position signal is detected, then the consecutively-produced representative value corresponding thereto; otherwise, the average of the n consecutively-produced representative values.

BRIEF DESCRIPTION OF THE DRAWINGS

In order that the present invention may be better understood, a preferred embodiment will now be described with reference to the accompanying drawings, which, however, are given for the purposes of illustration only, and are therefore not limitative of the present invention, and wherein:

FIG. 1 is a schematic view of an analog picture signal which excludes and includes noise components, with sampling periods and sampling sub-periods;

FIG. 3 is a schematic view of a mirror shown in FIG. 2;

FIG. 4 is a schematic view of signals for explaining the circuit in FIG. 2;

DESCRIPTION OF THE EMBODIMENT

Figure 2:
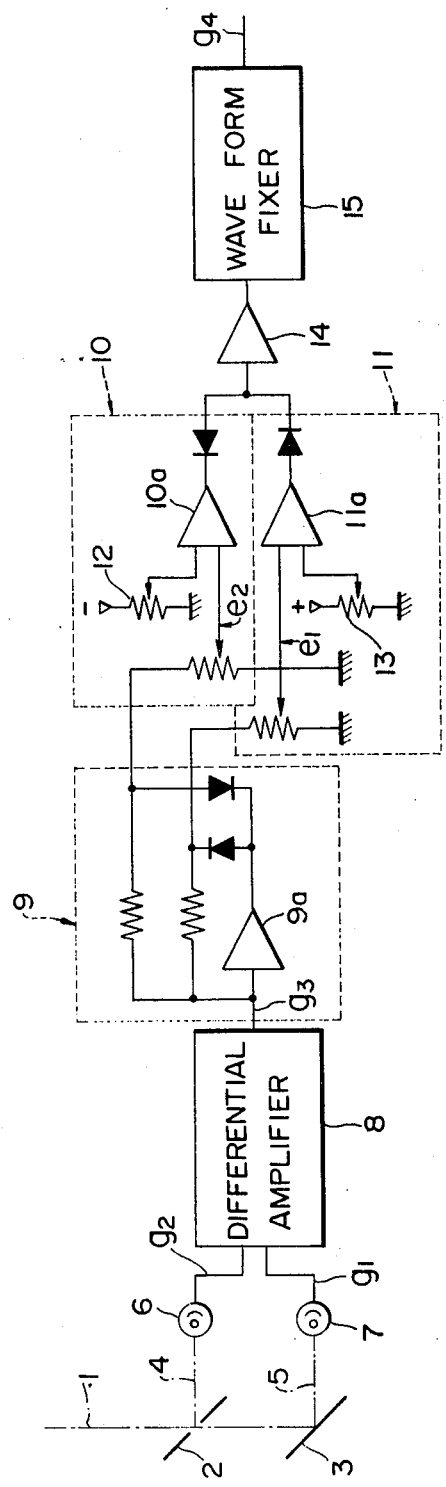
FIG. 2 is a block diagram of a circuit for obtaining a discrimination signal, which is used in the present invention.

In FIG. 2 is shown one embodiment of a circuit for obtaining a discrimination signal $g_4$ hereinafter referred to. First, a picture signal or sharp signal $g_1$ and an unsharp or smoothed signal $g_2$ are produced in a conventional manner as follows: A light beam 1 emitted from an original picture which is not shown, is focused onto the center of a mirror 2 which has a small hole 21 in its center, as shown in FIG. 3. Hence the part of the light beam 1, which has a strong analytical power, passes through this hole, and is then incident, after being reflected from another mirror 3, on a photoelectric converter element 7. This photoelectric converter element 7 produces the picture signal or sharp signal $g_1$, as shown in FIG. 4. On the other hand, the part of the light beam 1, which has a not so strong analytical power as the central part, is reflected from the edge portions 22 of the mirror 2, as shown in FIG. 3, and is incident on the photoelectric converter element 6. The photoelectric converter element 6 produces the unsharp or smoothed signal $g_2$, which represents the general trend of the intensity of the original picture, without the sharp peaks and troughs associated with the sharp signal $g_1$, as shown in FIG. 4. The sensitivities of the converters 6 and 7 are adjusted so as to bring the sharp signal $g_1$ and the unsharp signal $g_2$ to the same scale. The unsharp signal is a sort of smoothed version of the sharp signal.

Then, the picture signal $g_1$ and the unsharp signal $g_2$ are input to a differential amplifier 8 in which the level difference between the two signals $g_1$ and $g_2$ is detected and which outputs a detail contrasting signal $g_3$ in which extreme values appear in certain negative and positive levels, as shown in FIG. 4 $g_3$.

The detail contrasting signal $g_3$ is sent to an absolute value amplifier or signal polarity separator 9 including an operational amplifier 9a, and then to operational amplifiers 10a and 11a of negative and positive comparator circuits 10 and 11. Each comparator circuit 10 or 11 also includes a potentiometer 12 or 13 which is coupled to a standard voltage source (not shown), and an input terminal of the operational amplifier 10a or 11a.

In order to discriminate the extreme positions in the detail contrasting signal $g_3$, positive and negative threshold levels 16 and 17 are set to the detail contrasting signal $g_3$ by adjusting the potentiometers 13 and 12 depending on the amplitude of the noise components, as shown in FIG. 4 $g_3$. Then, the comparator circuits 10 and 11 discriminate the negative and the positive extreme positions in which the levels are beyond the threshold levels 16 and 17.

The output signals from the negative and the positive comparator circuits 10 and 11 are sent to a buffer amplifier 14 and then to a wave form fixer 15 for producing a sharp wave form. The wave form fixer 15 outputs a discrimination signal $g_4$ including negative and positive extreme position signals having a certain level, as shown in FIG. 4. As clearly shown in FIG. 4, the positions of the negative and the positive extreme position signals of the discrimination signal $g_4$ correspond to the extreme positions in the detail contrasting signal $g_3$ and also to the extreme positions in the picture signal $g_1$. The discrimination signal $g_4$ is used for controlling a device for sampling a picture signal $g_1$, as hereinafter described.

Figure 5:
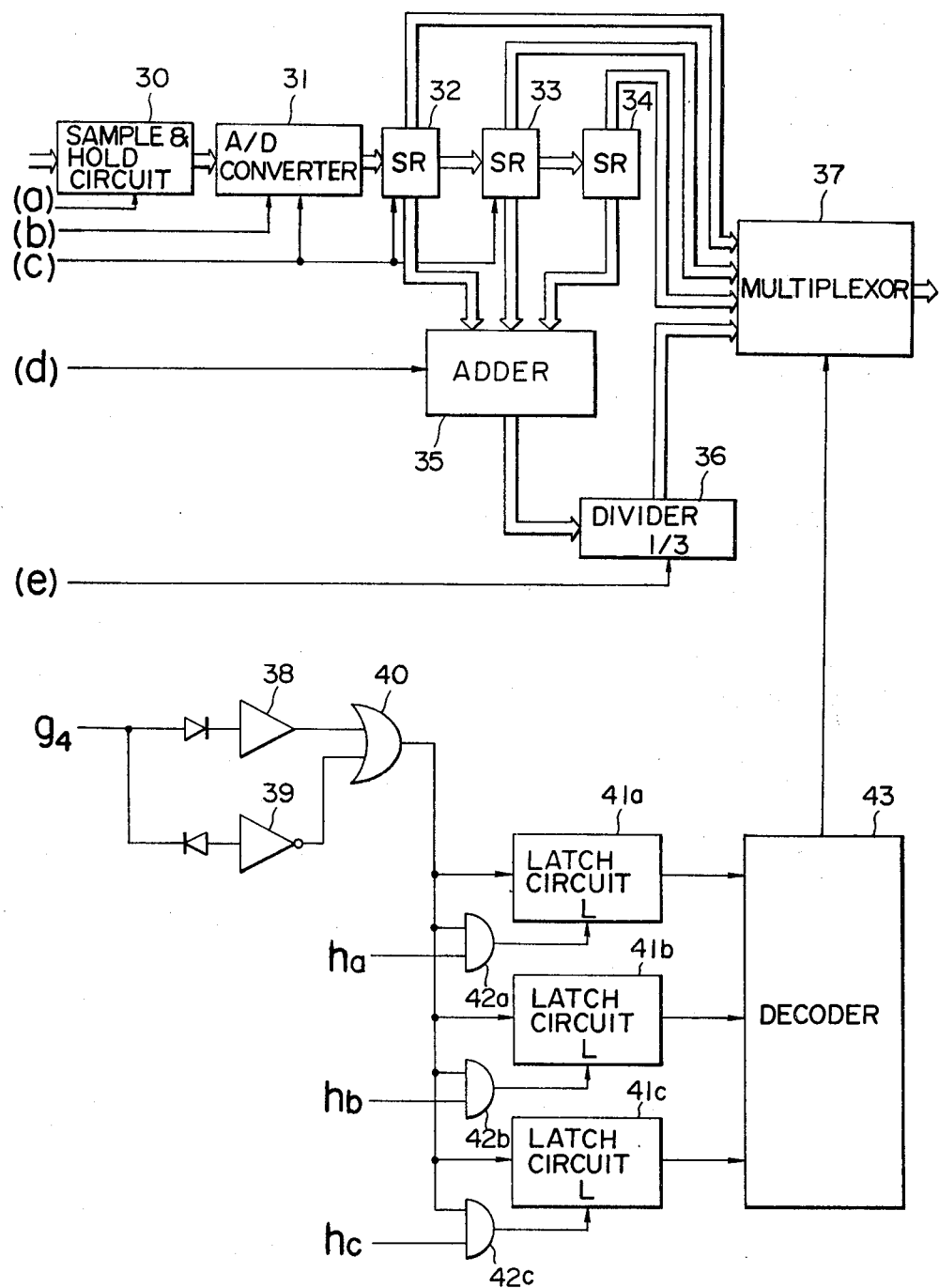
FIG. 5 is a block diagram of a device for sampling a picture signal according to the present invention.

In FIG. 5 is shown a block diagram of a device for sampling a picture signal $g_1$ according to the present invention, wherein three sampling sub-signals are formed in one sampling period.

An analog signal such as a picture signal is input to a sample and hold circuit 30 and is sampled there in synchronization with a timing pulse (a) shown in FIG. 6a, having the same frequency $3f_0$ as the sampling sub-signals. The analog signal sampled is converted into a digital signal in an analog-digital converter 31 in synchronization with a timing pulse (b) shown in FIG. 6b.

The digitalized signal is then recorded sequentially in shift registers 32, 33 and 34 in synchronization with a timing pulse (c) shown in FIG. 6c. The consecutive three digital values recorded in the shift registers are sent to and added in an adder 35 in synchronization with a timing pulse (d) shown in FIG. 6d. The added value is sent to a divider 36 and is divided there by 3 to give the mean value, in synchronization with a timing pulse (e) shown in FIG. 6e. The mean value output from the divider 36 is sent to a multiplexor 37, while the consecutive three digital values recorded in the in the shift registers 32, 33 and 34 are sent to the multiplexor 37.

Figure 6:
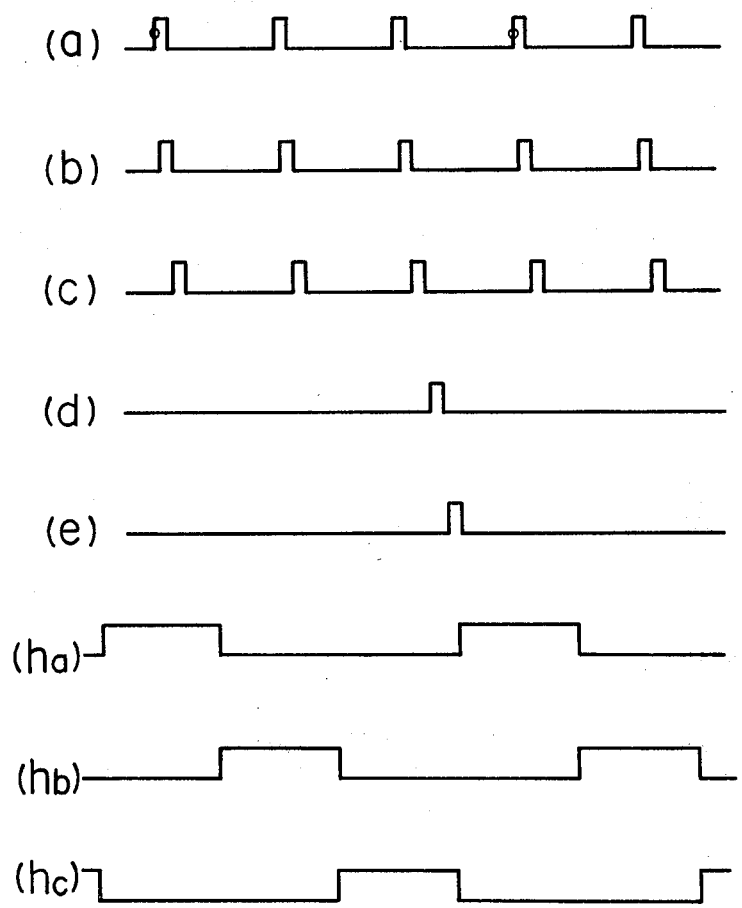
FIG. 6 is a schematic view of a time chart of timing pulses in FIG. 5.

The discrimination signal $g_4$ including the negative and the positive extreme position signals is sent to an OR gate 40 by ways of diodes, a noninverting buffer amplifier 38 and an inverting buffer amplifier 39. Then, the OR gate 40 outputs a signal which is the same as the discrimination signal $g_4$ except that all extreme position signals are positive. The signal output from the OR gate 40 is sent to latch circuits 41a, 41b and 41c and AND gates 42a, 42b and 42c. A timing pulses ha, hb and hc, as shown in FIG. 6 ha, hb, and hc, for selecting the digital values recorded in the shift registers 32, 33 and 34 when the extreme position signal is output from the OR gate 40, are sent to the AND gates 42a, 42b and 42c, as hereinafter described. Each AND gate 42a, 42b or 42c outputs a high or low level signal to the latch terminal of the latch circuit 41a, 41b or 41c.

When the level of the signal output from the OR gate 40 is high, i.e. the extreme position signal is output from the OR gate 40, while the level of the timing pulse ha, hb or hc is high, the AND gate 42a, 42b or 42c outputs the high level signal and the latch circuit 41a, 41b or 41c latches the signal output from the OR gate 40 therein and outputs a high level signal to a decoder 43. Then, the decoder 43 outputs a code for passing the digital value recorded in the shift register 32, 33 or 34 from the multiplexor 37.

On the other hand, when the level of the signal output from the OR gate 40 is zero or low, i.e. no extreme position signal is output from the OR gate 40, the AND gates 42a, 42b and 42c output the low level signals and then the latch circuits 41a, 41b and 41c output the low level signals to the decoder 43. Then, the decoder 43 outputs a code for passing the mean value calculated in the divider 36 from the multiplexor 37. The signal output from the multiplexor 37 is sent on to the following device, such as a memory.

It is readily understood that in the sampling period V in FIG. 4, according to the prior art method described above the extreme value of the sampling sub-signals may be picked up for the level of the sampling signal, but according to the present invention, since no discrimination signal $g_4$ is detected, the mean value of the sampling sub-signals is taken for the level of the sampling signal.

According to the present invention, of course, the sampling sub-signals formed during one sampling period are not restricted to three, and can be more than three.

According to the present invention, it is within the scope of the present invention that instead of the unsharp signal $g_2$ another analog signal may be used, such as one which is produced by passing the picture signal $g_1$ through a proper low-pass filter, a similar signal to the unsharp signal, which is mutually related to the picture signal $g_1$, or the like.

According to the present invention, it is also within the scope of the present invention that the discrimination signal may be obtained depending on the extremes of an analog signal which is mutually related to the picture signal $g_1$.

Although the present invention has been shown and described with reference to the preferred embodiment thereof, it should be understood that various changes and modifications of the form and the content thereof may be made therein without departing from the scope of the present invention.

What is claimed is:

1. A method of analog-digital conversion; wherein digital signals are produced at a certain sampling frequency rate corresponding to an first analog signal; and wherein values representative of the first analog signal are produced at a frequency rate which is some multiple n, where n is greater than 1, of the sampling frequency rate, characterized in that the level difference between the first analog signal and a second analog signal which is a smoothed version of the first analog signal, is detected to obtain a third analog signal including extreme values;

that extreme positions in the third analog signal are discriminated in synchronization with n consecutively-produced representative values by setting negative and positive threshold levels to obtain a fourth signal including extreme position signals; and that each digital signal produced is obtained from the n consecutively-produced representative values, as being: if the extreme position signal is detected, then the consecutively-produced representative value corresponding to said extreme position signal; otherwise, the average of the n consecutively-produced representative values.

2. A method according to claim 1, wherein the second analog signal is an unsharp signal.

3. A method according to claim 1 or 2, wherein the threshold levels are set by a comparator.

4. A method according to claim 3, wherein n equals three.

5. A method of picture reproduction, wherein: a scanning head scans an original picture and produces an first analog original picture signal; wherein said first analog original picture signal is converted into digital original picture signals; wherein the digital original picture signals are stored in a memory; wherein digital reproduction picture signals are read out of the memory and are converted into an analog reproduction picture signal which is used to produce a reproduction picture; wherein the digital original picture signals are produced at a certain sampling frequency rate, and wherein values representative of the first analog original picture signal are produced at a frequency rate which is some multiple n, where n is greater than 1, of the sampling frequency rate, characterized in that the level difference between the first analog original picture signal and a second analog signal which is a smoothed version of the first analog original picture signal, it detected to obtain a third analog signal including extreme values;

that extreme positions in the third analog signal are discriminated in synchronization with n consecutively-produced representative values by setting negative and positive threshold levels to obtain a fourth signal including extreme position signals; and that each digital signal produced is obtained from the n consecutively-produced representative values, as being: if the extreme position signal is detected, then the consecutively-produced representative value corresponding to said extreme position signal; otherwise, the average of the n consecutively-produced representative values.

6. A method according to claim 5, wherein the second analog signal is an unsharp signal.

7. A method according to claim 5 or 6, wherein the threshold levels are set by a comparator.

8. A method according to claim 7, wherein n equals three.

* * * * *